United States Patent
Ganesan et al.

(10) Patent No.: US 9,465,704 B2
(45) Date of Patent: Oct. 11, 2016

(54) VM AVAILABILITY DURING MANAGEMENT AND VM NETWORK FAILURES IN HOST COMPUTING SYSTEMS

(71) Applicant: VMWARE, INC., Palo Alto, CA (US)

(72) Inventors: Hariharan Jeyaraman Ganesan, Bangalore (IN); Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 170 days.

(21) Appl. No.: 14/271,522

(22) Filed: May 7, 2014

(65) Prior Publication Data

US 2015/0278041 A1 Oct. 1, 2015

(30) Foreign Application Priority Data

Mar. 26, 2014 (IN) .......................... 1621/CHE/2014

(51) Int. Cl.
| | | |
|---|---|---|
| G06F 11/00 | (2006.01) | |
| G06F 11/20 | (2006.01) | |
| G06F 11/07 | (2006.01) | |
| G06F 11/14 | (2006.01) | |

(52) U.S. Cl.
CPC ......... *G06F 11/203* (2013.01); *G06F 11/0712* (2013.01); *G06F 11/1484* (2013.01); *G06F 11/2025* (2013.01)

(58) Field of Classification Search
CPC ............. G06F 11/203; G06F 11/0709; G06F 11/0712; G06F 11/202; G06F 11/2023; G06F 11/1484; G06F 11/2025
USPC ....................... 714/4.11, 4.21, 10, 11, 13, 43
See application file for complete search history.

(56) References Cited

U.S. PATENT DOCUMENTS

| | | | |
|---|---|---|---|
| 8,185,776 B1 * | 5/2012 | Gentes et al. ....... | G06F 11/1438 714/4.11 |
| 8,201,169 B2 * | 6/2012 | Venkitachalam et al. ................... | G06F 9/45533 718/1 |
| 2005/0071470 A1 | 3/2005 | O'Brien et al. | |
| 2005/0108593 A1 * | 5/2005 | Purushothaman et al. ................... | G06F 11/2028 714/4.11 |
| 2006/0112297 A1 | 5/2006 | Davidson | |
| 2012/0159235 A1 * | 6/2012 | Suganthi et al. ... | G06F 11/2028 714/4.11 |
| 2012/0278801 A1 * | 11/2012 | Nelson et al. ....... | G06F 9/45533 718/1 |

* cited by examiner

Primary Examiner — Joseph D Manoskey

(57) ABSTRACT

Techniques for virtual machine (VM) availability during management network failure and VM network failure in a first host computing system in a failover cluster are described. In one example embodiment, management network failure is identified in the first host computing system. The management network being coupled to a virtual management software in a management server and used for management functions. Migration of the VMs running on the first host computing system is then initiated to at least one other host computing system in the failover cluster via a migration network by a failover agent associated with the first host computing system. The migration network being isolated from the virtual management software and capable of handling live migrations.

21 Claims, 6 Drawing Sheets

VM AVAILABILITY DURING MANAGEMENT AND VM NETWORK FAILURES IN HOST COMPUTING SYSTEMS

RELATED APPLICATIONS

Benefit is claimed under 35 U.S.C. 119(a)-(d) to Foreign application Serial No. 1621/CHE/2014 filed in India entitled "VM AVAILABILITY DURING MANAGEMENT AND VM NETWORK FAILURES IN HOST COMPUTING SYSTEMS", filed on Mar. 26, 2014, by VMware, Inc., which is herein incorporated in its entirety by reference for all purposes.

BACKGROUND

Today's trend is to configure separate networks for management, virtual machines (VMs) and migration of VMs in virtual datacenters. Typically, in such virtual datacenters a set of virtualization-based distributed infrastructure services provides virtual machine monitoring and management to automate and simplify provisioning, optimize resource allocation, and provide operating system and application-independent high availability to applications at lower cost and without the complexity of solutions used with static, physical infrastructure and other such environments. One of these distributed services is, a failover service, which provides easy-to-manage, cost-effective (high availability) HA clusters for all applications running on VMs that are often used for critical databases, file sharing on a network, business applications, and customer services, such as electronic commerce websites. In the event of a server hardware failure, affected VMs are automatically restarted on other physical servers during a failover operation to reduce downtime and information technology (IT) service disruption and to further reduce any dedicated standby hardware and installation of additional software requirements.

However, if a host computing system is partially isolated (i.e., isolated from management and virtual machine networks and not the migration network) from the other host computing systems in a high availability (HA)) cluster in the virtual datacenter, any VMs running on the partially isolated host computing system may end up in two scenarios. In the first scenario, if the VMs running on the partially isolated host are kept powered on, then the VMs may not be accessible to any users as the VM network is isolated from the failed host computing system. In the second scenario, if the VMs running on the partially isolated host computing systems are powered off, the associated failover agent may power them in at least one other host computing system in the failover cluster and this can result in losing state of guest operating system (guest OS) and applications running on the VMs before the failover occurred.

SUMMARY

One or more embodiments disclosed herein provide a method for VM availability during management and VM network failures in host computing systems in a failover cluster in a virtual datacenter. In one aspect, the method includes identifying management network failure in a first host computing system. The management network being coupled to virtual management software in a management server and used for management functions. Further, the method includes initiating migration of the VMs running on the first host computing system to at least one other host computing system in the failover cluster via a migration network by a failover agent associated with the first host computing system. The migration network being isolated from the virtual management software and capable of handling live migrations.

Further embodiments of the present disclosure include a non-transitory computer-readable storage medium that includes instructions that enable a processing unit to implement one or more of the methods set forth above or the functions of the computer system set forth above. In one embodiment, a non-transitory computer-readable storage medium is provided having instructions that manage execution of a virtual machine. The instructions, when executed in a computing device, perform the steps of identifying management network failure in a first host computing system. The management network being coupled to virtual management software in a management server and used for management functions. The instructions further include initiating migration of the VMs running on the first host computing system to at least one other host computing system in the failover cluster via a migration network by a failover agent associated with the first host computing system. In some embodiments, the management network and the VM network can be provided on the same physical network.

Embodiments of the present disclosure provide a computer system. The computing system includes multiple host computing systems in a failover cluster in a virtual datacenter. The computing system further includes a management network, a VM network and a migration network that are communicatively coupled to the multiple host computing systems. Moreover, the computing system includes a management server that is communicatively coupled to the management network, wherein the management server includes a virtual management software including a failover module and each of the multiple host computing systems includes an associated failover agent, wherein the failover module and the each failover agent are configured for providing VM availability during management and VM network failures in a first host computing system in a failover cluster in the virtual datacenter.

DETAILED DESCRIPTION

Embodiments described herein provide VM availability during management and VM network failures in host computing systems in a virtual datacenter. The proposed technique places the partially isolated host computing system in a self-maintenance mode via the associated failover agent. Upon placing the partially isolated host computing system in the self-maintenance mode, the VMs running on the partially isolated host computing system are live migrated over active migration network associated with other host computing systems in the failover cluster in a distributed manner. This technique enables maintaining the state of guest OS and any applications running on the partially isolated host computing system without losing any data from the VMs before the occurrence of partial failover. This technique further enables client devices to access VMs via VM network without losing network access. Furthermore, implementation of this technique can be carried out without requiring any additional hardware. Also, redundancy can be achieved during network failures with no additional hardware.

System Overview and Examples of Operation

Figure 1:
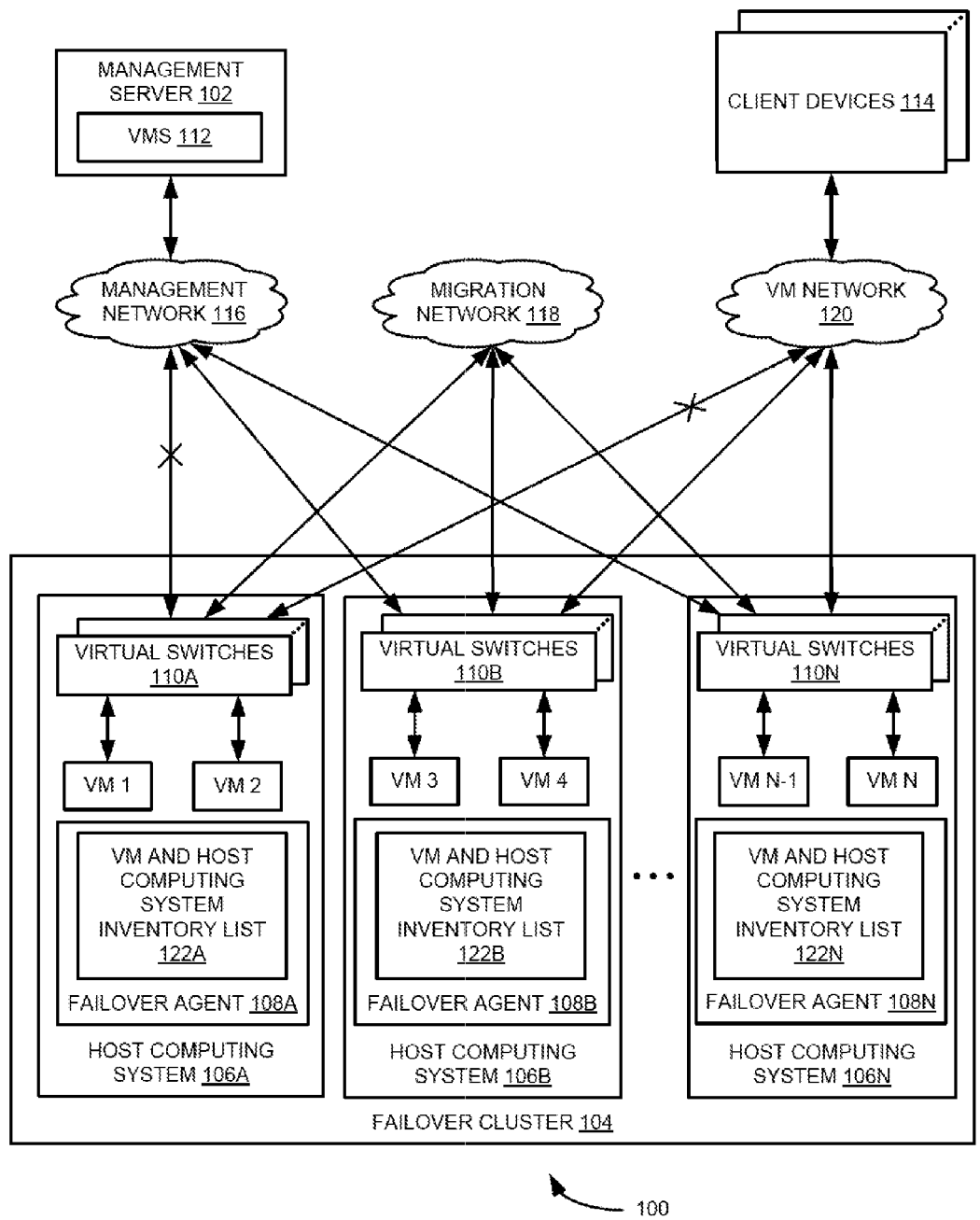
FIGS. 1-4 are block diagrams illustrating a system for VM availability during management and VM network failures in host computing systems present in a failover cluster in a virtual datacenter, according to an example embodiment.

FIG. 1 is a block diagram illustrating system 100 for providing VM availability during management and VM network failures in host computing systems in a failover cluster in a virtual datacenter, according to an example embodiment. As shown in FIG. 1, system 100 includes multiple host computing systems 106A-N and associated virtual machines (VMs) VM1-N hosted by multiple host computing systems 106A-N in a failover cluster 104. Also as shown in FIG. 1, system 100 includes management server 102 that is communicatively coupled to multiple host computing systems 106B-N via management network 116. Further as shown in FIG. 1, management server 102 includes virtual management software (VMS) 112. In addition as shown in FIG. 1, multiple host computing systems 106A-N include associated failover agents 108A-N. Moreover as shown in FIG. 1, multiple host computing systems 106B-N are communicatively coupled to migration network 118 and VM network 120 via associated virtual switches 110 B-N except for lost network connectivity between host computing system 106A and management and VM networks 116 and 120, respectively, via virtual switch 110A. In addition, as shown in FIG. 1, VM network is communicatively coupled to client devices 114.

In operation, failover agent 108A associated with first host computing system 106A in multiple host computing systems 106A-N in failover cluster 104 identifies management network 116 failure and the VM network 120 failure. For example, failover agent 108A detects a partial network connectivity failure (i.e., detects both the management network 116 connectivity and VM network 120 connectivity failures while the migration network 118 is still operational). If failover agent 108A is a master, then a partial network connectivity failure is identified and declared within a first predetermined time interval (for example, about 30 seconds) and if failover agent 108A is a slave then a partial network connectivity failure is identified and declared within a second predetermined time interval (for example, about 15 seconds). In these embodiments, management network 118 is configured to manage host computing systems in the failover cluster using management server 102. Further in these embodiments, the first host computing system 106A is configured to route network traffic of VMs (VM1 and VM2) via VM network 120.

Figure 2:
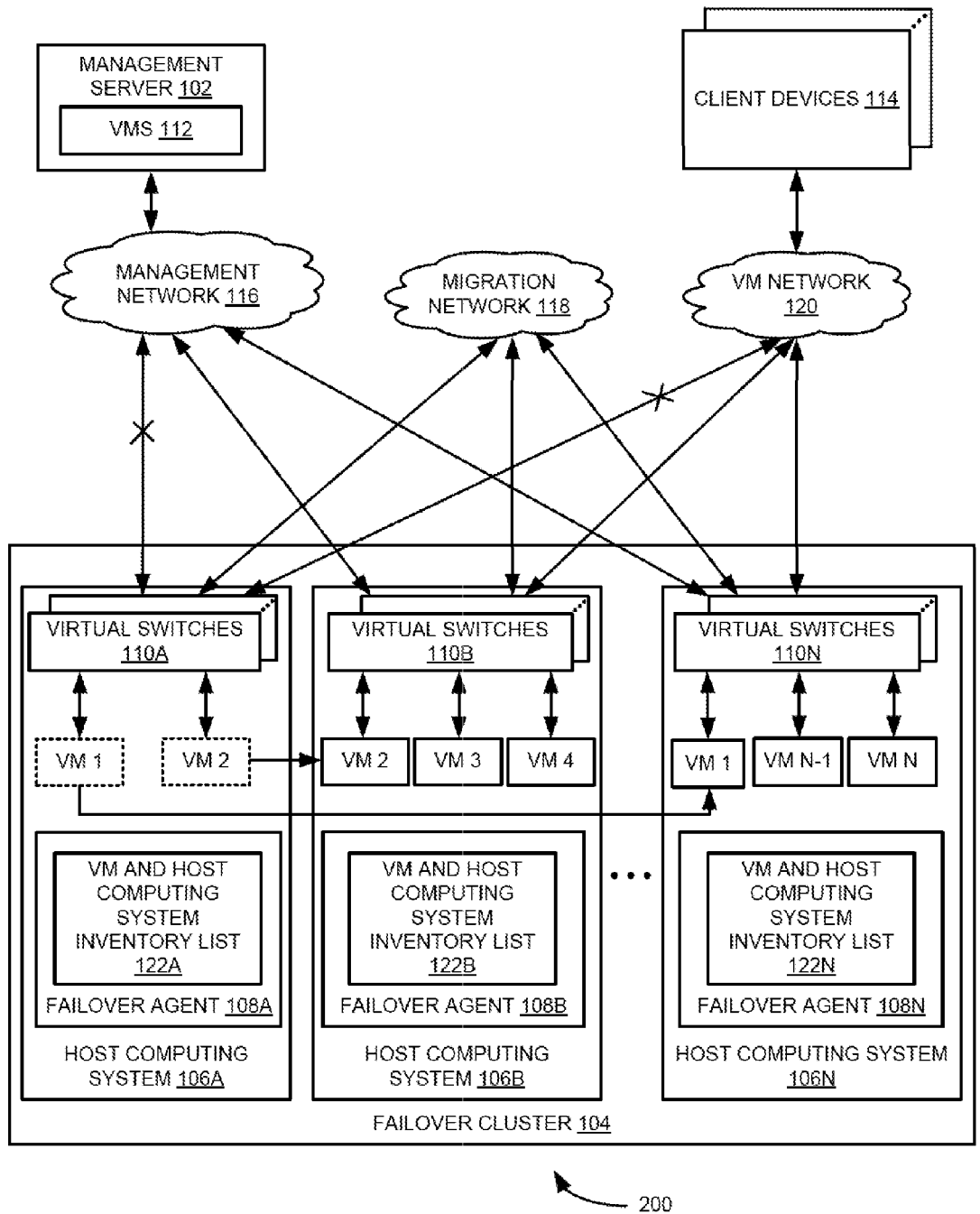

As shown in FIG. 2, failover agent 108A initiates migration of the VMs (VM1 and VM2) running on the first host computing system 106A to at least one other host computing system 106 B-N in failover cluster 104 via migration network 118. Since both management network 116 and VM network 120 are active for other computing systems 106 B-N in failover cluster 104, client devices 114 can access the migrated VMs (VM1 and VM2).

In some embodiments, failover agent 108A associated with first host computing system 106A initiates migration of the VMs (VM1 and VM2) running on first host computing system 106A to at least one other host computing system in failover cluster 104 based on VM and host computing system inventory list 122A maintained in failover agent 108A associated with first host computing system 106A.

Figure 3:
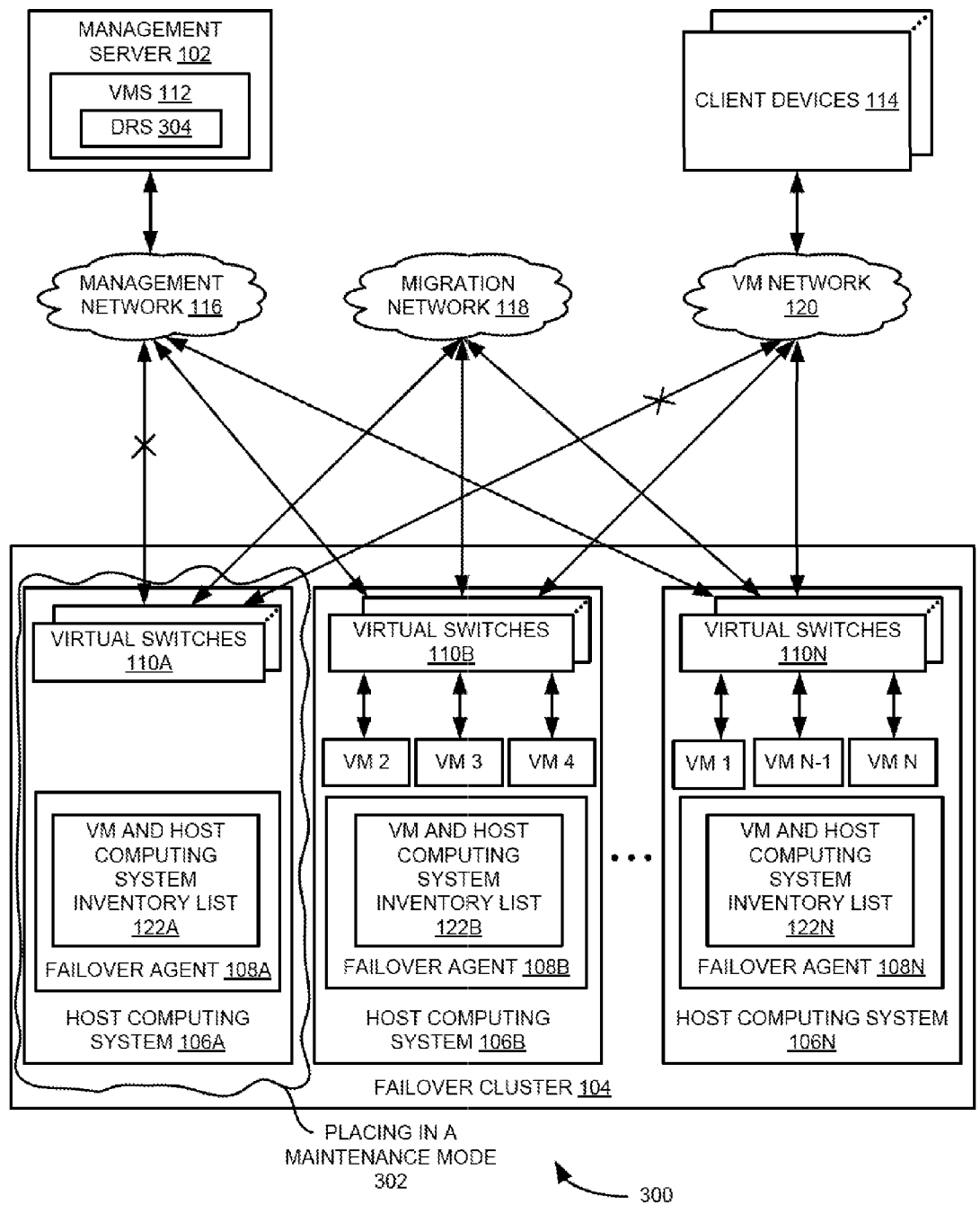
Figure 4:
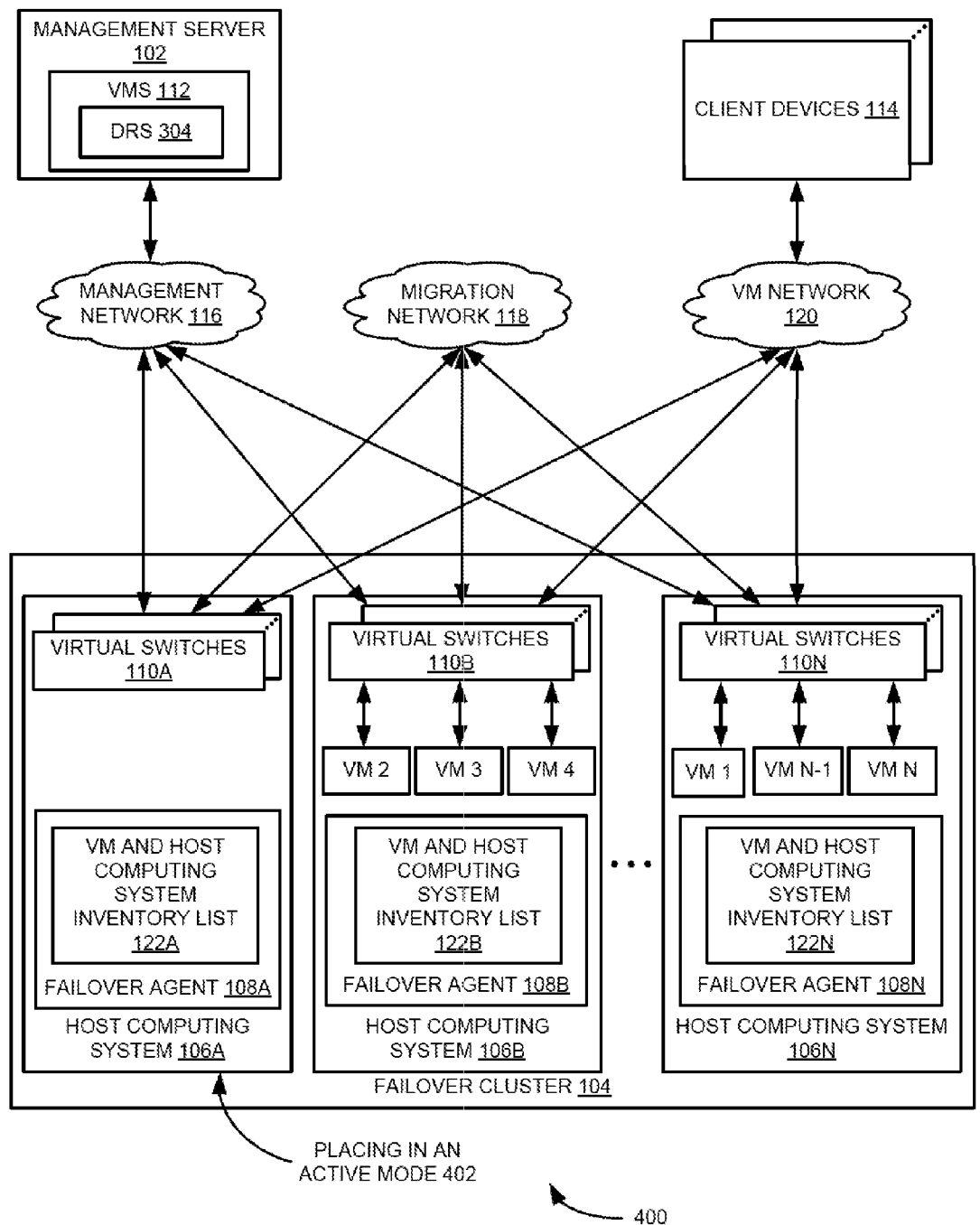

In some embodiments, workload among other host computing systems 106 B-N in failover cluster 104 is automatically balanced substantially after migrating the VMs (VM1 and VM2) to one or more other host computing systems 106 B-N based on using a resource scheduling framework, such as dynamic resource scheduler (DRS) 304 (e.g., as shown in FIGS. 3 and 4) residing in management server 102. In some embodiments, the management network and the VM network can be provided on the same physical network.

FIG. 3 shows placing host computing system 106A into maintenance mode 302 after migrating the VM 1 and VM 2 to host computing systems 106N and 106B, respectively. FIG. 4 shows placing host computing system 106A into active mode 402 upon both the management network and the VM network associated with the first host computing system comes back to active mode from the management and VM network failures in the virtual datacenter.

Also, although certain terms are used primarily herein, other terms could be used interchangeably to yield equivalent embodiments and examples. For example, the term "host computing system" may be used interchangeably with "physical host", "physical machine" or "physical device". Further for example, it is well-known that equivalent terms in the field of system virtualization or similar or related fields could be substituted for such terms as "physical computer," "hypervisor," "virtual machine," or the like. Further, the terms "virtual computing environment" and "virtual datacenter" are used interchangeably throughout the document. The terms "network failure", "network connectivity failure", and "lost network connectivity" are used interchangeably throughout the document.

Numerous specific details are set forth herein, such as data formats and code sequences and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 5:
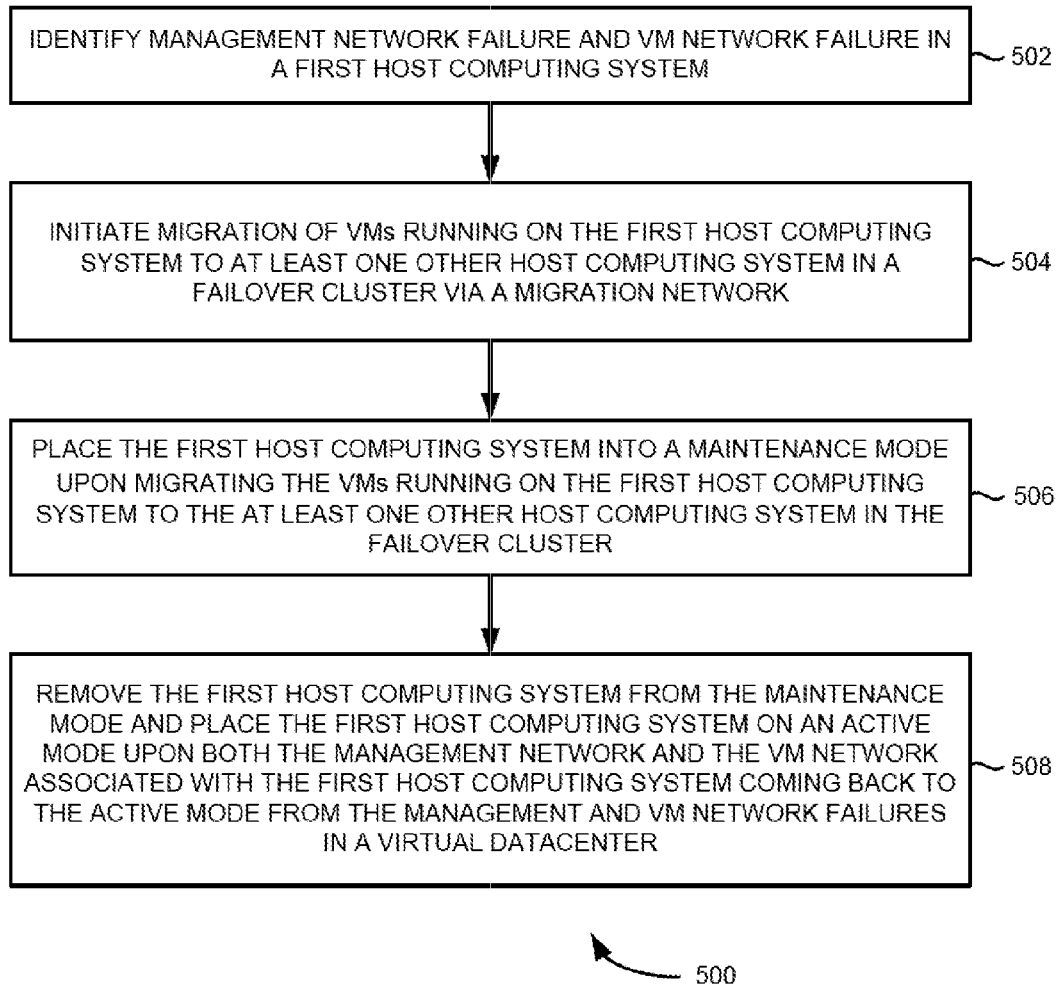
FIG. 5 is a flow diagram of process for VM availability during management and VM network failures in host computing systems in a virtual datacenter, according to an example embodiment.

FIG. 5 is a flow diagram of process 500, for providing VM availability during management and VM network failures in host computing systems in a failover cluster in a virtual datacenter, according to an example embodiment.

At block 502, process 500 identifies management network failure and VM network failure in a first host computing system. In these embodiments, the first host computing system is configured to route network traffic of VMs via the VM network and the management network is used to manage host computing systems in the failover cluster by a management server.

At block 504, migration of the VMs running on the first host computing system to at least one other host computing system in the failover cluster via a migration network by a failover agent associated with the first host computing system. In these embodiments, the migration network is used to migrate VMs running in the host computing systems in the fail over cluster. In some embodiments, migration of the VMs running on the first host computing system to at least one other host computing system in the failover cluster is initiated based on VM and host computing system inventory maintained in the failover agent associated with the first host computing system. Further in some embodiments, migration of the VMs running on the first host computing system to at least one other host computing system in the failover cluster is initiated based on last updated computing resource availability information at each host computing system. In some embodiments, the computing resource availability information in the failover agent of each host computing system is updated periodically by synchronizing with the management server. Furthermore in some embodiments, migration of the VMs running on the first host computing system to at least one other host computing system in the failover cluster is initiated based on updated computing resource availability information substantially before identification of the management network failure and VM network failure at the first host computing system. Also in these embodiments, the computing resource availability information in the failover agent of each host computing system is updated periodically by synchronizing with the management server.

At block 506, the first host computing system is placed in a maintenance mode upon migrating the VMs running on the first host computing system to the at least one other host computing system in the failover cluster. At step 508, the first host computing system is removed from the network maintenance mode and then places the first host computing system in an active mode upon both the management network and the VM network associated with the first host computing system comes back to active mode from the management and VM network failures in the virtual datacenter.

Process 500 for providing VM availability during management and VM network failures in host computing systems in a failover cluster in a virtual datacenter is explained in more detail above with reference to the system diagrams 100-400 shown in FIGS. 1-4.

Figure 6:
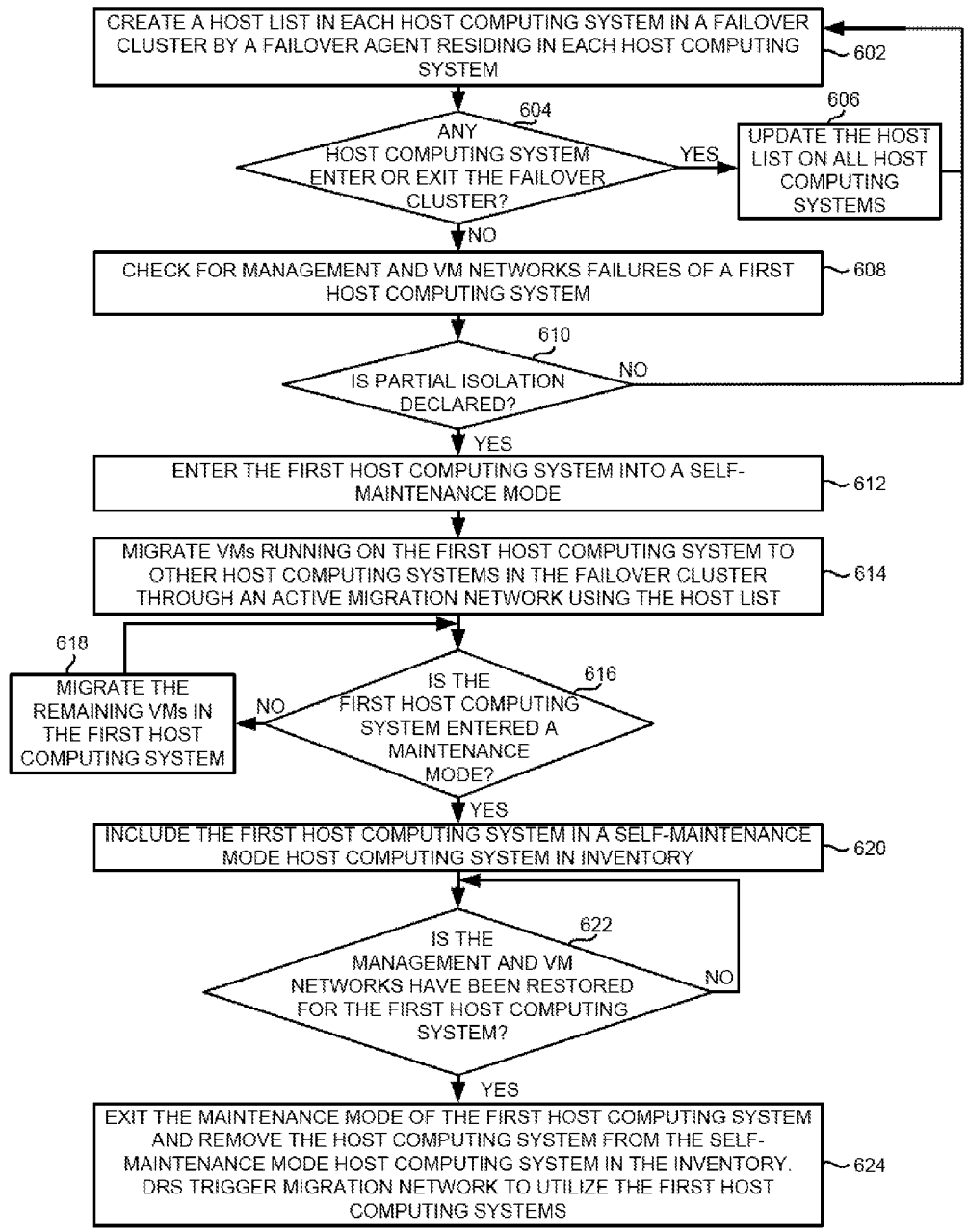
FIG. 6 is another flow diagram of process for VM availability during management and VM network failures in host computing systems in a virtual datacenter, according to an example embodiment.

FIG. 6 is a flow diagram of another process 600, for providing VM availability during management and VM network failures in host computing systems in a failover cluster in a virtual datacenter, according to an example embodiment.

At blocks 602, 604 and 606, process 600 maintains a host list (i.e., vm and host computing system inventory lists 122A-N as shown in FIGS. 1-4) in each host computing system in the failover cluster via a failover agent residing in each host computing system. At block 608, process 600 checks for management and VM network failures associated with a first host computing system. Based on a determination at block 610, if there is a partial isolation, i.e., the management and VM networks associated with the first host computing system have failed then at block 612 the first host computing system enters into a maintenance mode. Further based on the determination at block 610, if there no partial isolation, then the process returns to block 602 and continues checking for partial isolation.

At blocks 614, 616 and 618, VMs running on the first host computing system are migrated, using the migration network, to other host computing systems in the failover cluster via an active migration network using the host list in the first host computing system. At block 620, the first host computing system is included in a self-maintenance mode host computing system inventory.

At block 622, process 600 checks whether the management and VM networks associated with the first host computing system have been restored. Based on the determination at 622, if the management and VM networks have been restored the first host computing systems exits the self-maintenance mode and further the first host computing system is removed from the self-maintenance mode host computing system inventory. Further, process 600 triggers migration network to utilize the first host computing system via a dynamic resource scheduler residing in the management server.

The architecture shown in FIGS. 1-4 may in some embodiments be partially or fully virtualized. For example, systems 100-400 shown in FIGS. 1-4 may be one or possibly many VMs executing on physical hardware and managed by a hypervisor, VM monitor, or similar technology. Also, multiple host computing systems 106 A-N show in FIGS. 1-4 may include virtualization logic to manage multiple VMs.

In an example embodiment, components/modules of failover agents 108 A-N are implemented using standard programming techniques. In other embodiments, failover agents 108 A-N may be implemented as instructions processed by a VM that executes as one of other programs.

Furthermore, in some embodiments, some or all of the components of failover agents 108 A-N may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Further, from the foregoing it will be appreciated that, although specific embodiments have been described herein for purposes of illustration, various modifications may be made without deviating from the spirit and scope of this disclosure. For example, the methods, techniques, and systems for migrating VMs across host computing systems based on cache characteristics in a virtualized datacenter are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule CPU time at the process level within an operating system. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for virtual machine (VM) availability during management network failure in a first host computing system in a failover cluster in a virtual datacenter, comprising:

identifying management network failure in the first host computing system, wherein the management network being coupled to virtual management software in a management server and used for management functions; and initiating migration of VMs running on the first host computing system to at least one other host computing system in the failover cluster via a migration network by a failover agent associated with the first host computing system upon identifying the management network failure, wherein the migration network being isolated from the virtual management software and capable of handling live migrations.

2. The method of claim 1, wherein initiating migration of the VMs running, on the first host computing system to at least one other host computing system in the failover cluster via the migration network by the failover agent associated with the first host computing system, comprises:

initiating migration of the VMs running on the first host computing system to at least one other host computing system in the failover cluster based on VM and host computing system inventory maintained in the failover agent associated with the first host computing system.

3. The method of claim 1, further comprising identifying VM network failure in the first host computing system, wherein the first host computing system being configured to route network traffic of the VMs via, the VM network.

4. The method of claim 3, wherein initiating migration of the VMs running on the first host computing system to at least one other host computing system in the failover cluster via the migration network by the failover agent associated with the first host computing system, comprises:

initiating migration of the VMs running on the first host computing system to at least one other host computing system in the failover cluster based on last updated computing resource availability information at each host computing system, wherein the computing resource availability information at each host computing system is updated in the failover agent by periodically synchronizing with the management server.

5. The method of claim 4, wherein initiating migration of the VMs running on the first host computing system to at least one other host computing system in the failover cluster based on last updated computing resource availability information at each host computing system, comprises:

initiating migration of the VMs running on the first host computing system to at least one other host computing system in the failover cluster based on updated computing resource availability information before identification of the management network failure and the VM network failure at the first host computing system, wherein the computing resource availability information at each host computing system is updated in the failover agent by periodically synchronizing with the management server.

6. The method of claim 1, further comprising:

placing the first host computing system into a maintenance mode upon migrating the VMs running on the first host computing system to the at least one other host computing system in the failover cluster.

7. The method of claim 6, further comprising:

removing the first host computing system from the network maintenance mode and placing the first host computing system on active mode upon both the management network and the VM network associated with the first host computing system coming back to active mode from the management and VM network failures in the virtual datacenter.

8. A non-transitory computer-readable storage medium including instructions that are configured, when executed by a computing system, to perform a method for VM availability during management network failure in a first host computing system in a failover cluster, the method comprising:

identifying management network failure in the first host computing system, wherein the management network being coupled to virtual management software in a management server and used for management functions; and initiating migration of VMs miming on the first host computing system to at least one other host computing system in the failover cluster via a migration network by a failover agent associated with the first host computing system upon identifying the management network failure, wherein the migration network being isolated from the virtual management software and capable of handling live migrations.

9. The non-transitory computer-readable storage medium of claim 8, wherein initiating migration of the VMs running on the first host computing system to at least one other host computing system in the failover cluster via the migration network by the failover agent associated with the first host computing system, comprises:

initiating migration of the VMs running on the first host computing system to at least one other host computing system in the failover cluster based on VM and host computing system inventory maintained in the failover agent associated with the first host computing system.

10. The non-transitory computer-readable storage medium of claim 8, further comprising:

identifying VM network failure in the first host computing system, wherein the first host computing system being configured to route network traffic of the VMs via the VM network.

11. The non-transitory computer-readable storage medium of claim 10, wherein initiating migration of the VMs running on the first host computing system to at least one other host computing system in the failover cluster via the migration network by the failover agent associated with the first host computing system, comprises:

initiating migration of the VMs running on the first host computing system to at least one other host computing system in the failover cluster based on last updated computing resource availability information at each host computing system, wherein the computing resource availability information at each host computing system is updated in the failover agent by periodically synchronizing with the management server.

12. The non-transitory computer-readable storage medium of claim 11, wherein initiating migration of the VMs running on the first host computing system to at least one other host computing system in the failover cluster based on last updated computing resource availability information at each host computing system, comprises:

initiating migration of the VMs running on the first host computing system to at least one other host computing system in the failover cluster based on updated computing resource availability information before identification of the management network failure and the VM network failure at the first host computing system, wherein the computing resource availability information at each host computing system is updated in the failover agent by periodically synchronizing with the management server.

13. The non-transitory computer-readable storage medium of claim 8, further comprising:
placing the first host computing system into a maintenance mode upon migrating the VMs running on the first host computing system to the at least one other host computing system in the failover cluster.

14. The non-transitory computer-readable storage medium of claim 13, thither comprising:
removing the first host computing system from the network maintenance mode and placing the first host computing system on active mode upon both the management network and the VM network associated with the first host computing system coming back to active mode from the management and VM network failures in the virtual datacenter.

15. A computing system for VM availability during management and VM network failures in a first host computing system in a failover cluster, the system comprising:
multiple host computing systems, wherein each host computing system hosting multiple VMs; and
a management server communicatively coupled to the multiple host computing systems, wherein the management server comprising a virtual management software, and wherein each host computing system comprising an associated failover agent and a VM and host computing system inventory list maintained by the associated failover agent, and they are configured to:
identify management network failure in the first host computing system, wherein the management network being coupled to the virtual management software in the management server and used for management functions; and
initiate migration of VMs running on the first host computing system to at least one other host computing system in the failover cluster via a migration network by a failover agent associated with the first host computing system upon identifying the management network failure, wherein the migration network being isolated from the virtual management software and capable of handling live migrations.

16. The computing system of claim 15, wherein initiating migration of the VMs running on the first host computing system to at least one other host computing system in the failover cluster via the migration network by the failover agent associated with the first host computing system, comprises:
initiating migration of the VMs running on the first host computing system to at least one other host computing system in the failover cluster based on VM and host computing system inventory maintained in the failover agent associated with the first host computing system.

17. The computing systems of claim 15, further configured to:
identify VM network failure in the first host computing system, wherein the first host computing system being configured to route network traffic of the VMs via the VM network.

18. The computing systems of claim 17, wherein initiating migration of the VMs running on the first host computing system to at least one other host computing system in the failover cluster via, the migration network by the failover agent associated with the first host computing system, comprises:
initiating migration of the VMs running on the first host computing system to at least one other host computing system in the failover cluster based on last updated computing resource availability information at each host computing system, wherein the computing resource availability information at each host computing system is updated in the failover agent by periodically synchronizing with the management server.

19. The computing system of claim 18, wherein initiating migration of the VMs running on the first host computing system to at least one other host computing system in the failover cluster based on last updated computing resource availability information at each host computing system, comprises:
initiating migration of the VMs running on the first host computing system to at least one other host computing system in the failover cluster based on updated computing resource availability information before identification of the management network failure and VM network failure at the first host computing system, wherein the computing resource availability information at each host computing system is updated in the failover agent by periodically synchronizing with the management server.

20. The computing system of claim 15, further configured to:
place the first host computing system into a maintenance mode upon migrating the VMs running on the first host computing system to the at least one other host computing system in the failover cluster.

21. The computing system of claim 20, further configured to:
remove the first host computing system from the network maintenance mode and placing the first host computing system on active mode upon both the management network and the VM network associated with the first host computing system coming back to active mode from the management and VM network failures in the virtual datacenter.

* * * * *